July 12, 1966   J. F. MILLET   3,260,614
GRAPHITISED CARBON ARTICLES CONTAINING RARE EARTHS
Filed Jan. 24, 1962
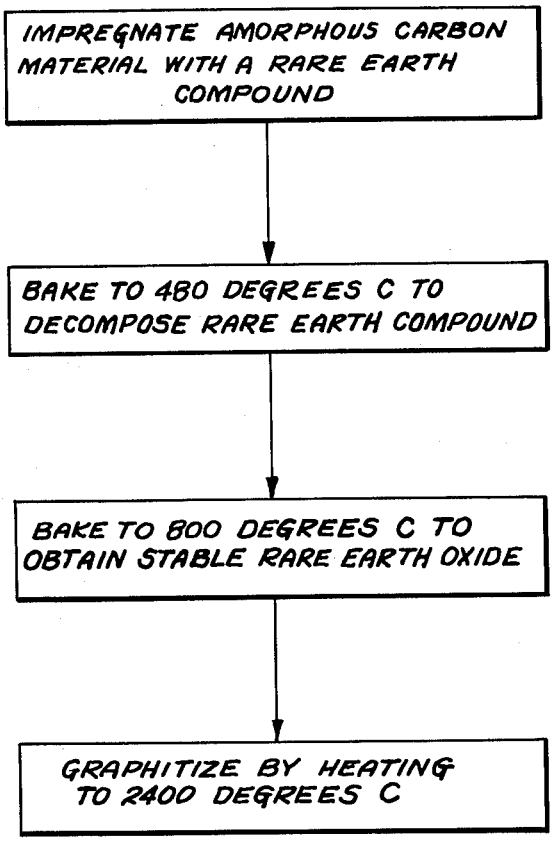
INVENTOR
JACQUES MILLET
BY *Hocombe, Wetherill & Brisebois*
ATTORNEYS

United States Patent Office 3,260,614
Patented July 12, 1966

3,260,614
GRAPHITISED CARBON ARTICLES
CONTAINING RARE EARTHS
Jacques F. Millet, Paris, France, assignor to Societe le Carbone-Lorraine, Paris, France, a French body corporate
Filed Jan. 24, 1962, Ser. No. 168,524
14 Claims. (Cl. 117—46)

Amorphous artificial carbons are composed of a wide variety of natural or artificial carbon grains agglomerated by a carbonised binder, and the bodies thus obtained reveal a more or less strong and fine porosity. The baking of these carbons at temperatures above 1800° C. results in graphitised bodies, the hardness and electrical resistance of which are lower and the friction properties of which are improved. The transformation of carbon to a better crystallised state can be influenced by the presence of various elements, in particular by silica and iron as already mentioned in earlier publications.

The present invention has for an object the provision of a process for preparing a graphite in which the graphitisation ratio is increased, and having improved mechanical, physical and electrical properties.

The invention consist in a process for preparing a graphite which consists in introducing a rare earth compound or compounds into a carbonaceous starting material, and then graphitising the material.

A flow diagram illustrating the process is annexed hereto.

The invention also consist in a graphite which consists of a carbonaceous material into which a rare earth compound or compounds has/have been introduced, the material being subsequently graphitised.

The invention also consists in an article made from a graphite which consists of a carbonaceous material into which a rare earth compound or compounds has/have been introduced, the material being subsequently graphitised.

It is found that the use of a rare earth compound or compounds, even in a very low proportion, leads to more efficient graphitising than the use of known substances.

Among the elements belonging to the group of rare earths which can be used in accordance with the invention, cerium is particularly suitable. It can be easily introduced, either in the form of a decomposable ceric salt or in the form of ceric oxide, or in mixture with other elements of rare earths with which it occurs naturally.

The rare earth compound or compounds can be mixed with various constituents of the carbonaceous starting material in the form of powder, but as its action upon the graphitising is notable even when it or they are used in very small quantities, introduction in solution is preferable. Up to 10% of the rare earth compound or compounds may be present in the treated material, as a result of the introduction of the rare earth compound or compounds, before the material is graphitised.

The invention will be better understood according to the following example, which is intended to illustrate but not to limit the invention.

*Example.*—A carbonaceous starting material is impregnated with a solution prepared from approximately 15 grams of ceric carbonate and 0.5 litre of concentrated hydrochloric acid and 0.5 litre of water. The material to be impregnated can comprise carbon with a petroleum coke basis or a carbon black basis, and it can be in various shapes, such as plates, round bars, and machined members of all kinds. It is generally baked at a temperature below 1200° C.

The material is immersed in the solution, using any of the known impregnation techniques alternatively under vacuum and pressure. The impregnated material is withdrawn and then dried. The ceric carbonate is subsequently decomposed by raising it to a temperature of 480°C., then the temperature is raised to 800° C. in order to obtain a stable ceric oxide.

The amount of ceric oxide retained in the material can be up to 10%, but it is preferably around 2%.

The properties of the material baked at 800° C. differ substantially from the properties of similar material baked at the same temperature but not impregnated. In the following table, the increase in the graphitisation ratio for two varieties of impregnated material can be seen. Variety 1 comprises a carbon with a petroleum coke basis and variety 2 comprises a carbon with a carbon black basis. The graphitisation ratio is determined according to the R. E. Franklin method, described in Acta Crystallographica, volume 4, 1951, at page 253 et seq.

| Temperature, ° C. | Variety 1 without ceric oxide | Variety 1 impregnated with ceric oxide | Variety 2 without ceric oxide | Variety 2 impregnated with ceric oxide |
|---|---|---|---|---|
| 1,400 | 0 | 0 | 0 | 0 |
| 1,600 | 0 | .09 | 0 | 0 |
| 1,800 | | 0.12 | 0.10 | 0.05 |
| 2,000 | 0.13 | 0.18 | 0.13 | 0.07 |
| 2,200 | 0.35 | 0.41 | 0.19 | 0.18 |
| 2,400 | 0.45 | 0.72 | 0.19 | 0.30 |
| 2,600 | 0.65 | | 0.19 | 0.30 |

The introduction of small quantities of a cerium compound, by itself or mixed with other rare earths, into the material reduces the cost of the graphitising. It is possible to obtain higher graphitisation ratios at relatively lower temperatures, and economy in heating results in the manufacturing process.

It will be evident that the cerium compound is cited as a non-limiting example, and that any other element or elements belonging to the series of rare earths can be used under the same conditions with equally satisfying results.

The important effect of the transformation of the crystalline structure of the carbon on its physical, mechanical and electrical properties has been mentioned. The process according to the invention enables the graphitisation ratio to be increased and consequently graphites may be obtained with remarkable qualities of density, wear resistance, electric and thermal conductivity and frictional properties which are capable of a wide field of applications. The varieties of graphites obtained according to the invention are excellent construction materials in engineering, such as for use in heat exchangers, and for articles such as friction members, electrodes, brushes, and the like.

I claim:

1. A process for graphitising amorphous carbon material comprising: introducing a material consisting essentially of rare earths into the carbonaceous material to yield an intermediate material containing up to 10% of the rare earth material in terms of rare earth oxide, and graphitising said intermediate material by heating it to at least 2400° C. to yield a graphite having increased graphitisation ratio, improved frictional properties and wear-resistance.

2. A process for graphitising carbonaceous material according to claim 1, wherein said rare earth material is in powdered form.

3. A process for graphitising carbonaceous material according to claim 1, wherein said rare earth material is in solution.

4. A process for graphitising carbonaceous material according to claim 3, wherein said rare earth material is a naturally occurring mixture of rare earth compounds.

5. A process for graphitising carbonaceous material according to claim 3, wherein said rare earth material is a solution of a naturally occurring mixture of rare earth compounds.

6. A process for graphitiiing carbonaceous material according to claim 1, wherein before the graphitising step, said intermediate material is heated to transform the rare earth material to a stable state.

7. A process for graphitising carbonaceous material according to claim 6, wherein said rare earth material comprises a cerium compound.

8. A process for graphitising carbonaceous material according to claim 6, wherein said rare earth material comprises a ceric salt.

9. A process for graphitising carbonaceous material according to claim 1, wherein said rare earth material comprises ceric carbonate.

10. A process for graphitising carbonaceous material according to claim 1, wherein said rare earth material comprises a rare earth oxide.

11. A process for graphitising carbonaceous material according to claim 1, wherein said intermediate material contains about 2% of rare earth material.

12. A process for graphitising carbonaceous material according to claim 7, wherein said cerium compound is transformed to a heat-stable state by heating to 800° C.

13. A process for graphitising carbonaceous material according to claim 12, wherein said graphitising temperature is from 1,600 to 2,600° C.

14. A process for graphitising carbonaceous material according to claim 7, wherein said cerium compound comprises a solution of cerium carbonate in aqueous hydrochloric acid, and is introduced into said carbonaceous material by impregnation followed by drying to yield said intermediate material.

References Cited by the Examiner

UNITED STATES PATENTS

| | | | |
|---|---|---|---|
| 1,000,761 | 8/1911 | Snyder | 117—228 XR |
| 2,448,685 | 9/1948 | Ramadanoff. | |
| 2,587,523 | 2/1952 | Prescott | 117—46 |

RICHARD D. NEVIUS, *Primary Examiner.*

MURRAY KATZ, JOSEPH B. SPENCER, W. L. JARVIS, A. GOLIAN, *Assistant Examiners.*